United States Patent [19]
Torin

[11] 3,741,664
[45] June 26, 1973

[54] METHOD FOR MEASURING THE LIGHT TRANSMISSION OF A PHOTOGRAPHIC FILM GIVING A DIGITIZED OUTPUT

[76] Inventor: Jan Magnus Torin, c/o Saab-Scania AB, 581 88 Linkoping, Sweden

[22] Filed: May 28, 1971

[21] Appl. No.: 147,950

[52] U.S. Cl............ 356/203, 250/219 FR, 356/206
[51] Int. Cl. ........................................... G01n 21/20
[58] Field of Search.................... 356/203, 175, 206; 250/219 FR

[56] References Cited
UNITED STATES PATENTS
3,006,238  10/1961  Eberline............................. 356/203

Primary Examiner—Ronald L. Wibert
Assistant Examiner—V. P. McGraw
Attorney—Ira Milton Jones

[57] ABSTRACT

Clock pulses are generated at a rate synchronized to scanning of a substance with a light beam. The light is energized in pulses having uniform duration in terms of clock pulses. Output of a photocell responding to incident light is integrated to produce a reference signal of linearly varying magnitude. Magnitude of output of photocell receiving light passed through the substance is compared with the reference signal, and a difference signal is produced whenever the difference between compared signals has a predetermined sign. During a predetermined uniform portion of every light pulse, clock pulses are counted so long as the difference signal persists, giving a digitized measure of substance transparency/opacity.

3 Claims, 4 Drawing Figures

INVENTOR
Jan Magnus Torin
BY [signature]
ATTORNEY

METHOD FOR MEASURING THE LIGHT TRANSMISSION OF A PHOTOGRAPHIC FILM GIVING A DIGITIZED OUTPUT

This invention relates to a method and a device for measuring the light transmission of a photographic film by scanning it with a beamed light inciding the film at a substantially right angle during relative movement between film and light point in a predetermined path, during which movement the intensity of the incident light as well as the light passing through the film are detected, the ratio between the light intensities being a measure of the light transmission.

It is possible to rapidly read-in and store large quantities of information on a comparatively small area of a photographic film. Since the film has high read-in velocity and a large degree of consolidation it is an attractive memory medium in many applications. This advantage is of course especially available when the information initially appears in the form of radiation, visible or non-visible.

Reading-out information stored on the film is far more difficult to carry out than reading in information, and in certain cases is preferably accomplished manually, e.g. in the case where the presence of a certain event, e.g. enemy activity, has to be verified. In other cases an automatic reading out is possible and even necessary, e.g. when very large quantities of information have to be read out or when certain characteristic data must be derived from a large number of film frames. This is the case in crystallographic investigations, for example where the presence of radiation maximums—so called reflexes obtained by X-ray diffraction—is photographically recorded. In such investigations a large number of film frames are obtained in investigating only one crystal, which film frames have to be evaluated optically and mathematically for information about the structure etc. of the crystal.

Several different devices for automatically reading out information stored on a film are known. One such device which is preferably used for automatically measuring the light transmission of crystallographic frames is already known from a publication in Journal of Scientific Instruments, volume 43, "A computer controlled film scanner" by Professor S. Abrahamsson. The read-out in this and similar known devices occurs in such a way that a signal is generated correspondingly to the blackening or light transparency of the film, in a surface element which is allowed to gradually move over the film in a predetermined path until the entire film is scanned. The size of the surface element is selected in view of the desired resolution. As a measure of the light transmission, as mentioned in the introduction, the relationship between the incident light and the light transmitted through the film is used. To eliminate as far as possible the influence of errors originating from variations of the intensity of the light the latter is held as constant as possible and the abovementioned signal is to be considered as an analogue signal.

It is known that analogue treatment requires more sophisticated circuits than digital treatment and the risk of disturbances is greater with analogue than with digital treatment. Since reading-out devices of the mentioned kind often work together with a computer, to be capable of treating the often very large quantities of information, this makes it further desirable that the signal corresponding to the blackening have digital character.

The invention is characterized in that a pulse signal is generated and that the intensity of the incident light is varied at a lower frequency which is in integral ratio to the frequency of the pulse signal, and that the pulses of the pulse signal are counted during time intervals which are synchronized with the intensity variation and whose duration is dependent upon the prevailing ratio of incident light intensity to intensity of light transmitted through the film, so that the number of counted pulses is a value of the light transmission.

By measuring the light transmission in this way a more reliable result can be obtained and the measurement can be performed by a simpler and cheaper device than it has previously been possible.

How a reader according to the invention is constructed will more clearly appear from the accompanying drawings, in which.

Although the method and the device according to the invention will be explained in connection with a film scanner of the kind described in the abovementioned publication, the invention must not be considered to be limited to this particular use. On the contary the method of measuring light transmission according to the invention is usable in many applications, e.g. for calculating the degree of non-light-transparent particles in a gas or a liquid.

Figure 1:
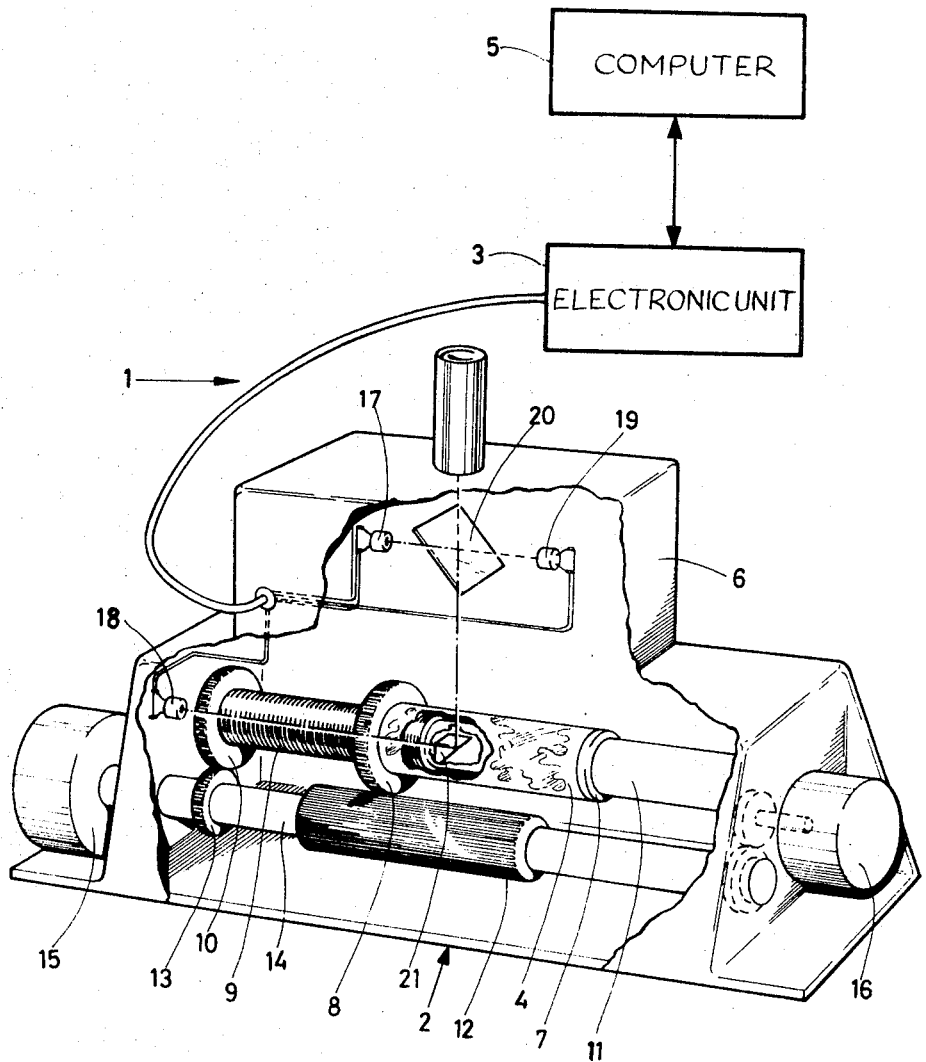
FIG. 1 is a diagrammatic perspective view, partly in section, showing a device for measuring in the light transmission of a photographic film according to the method of the invention.

In FIG. 1 the numeral 1 designates a film scanner which for the purpose of illustration can be considered as consisting of a mechanical unit 2, an electronic unit 3 and an optical unit. The mechanical unit serves to transport a film 4 which shall be transported in a predetermined path, and during this motion the scanning itself is carried out by the optical unit, and the calculation of the light transmission is performed by means of the electronic unit which is connected to a computer 5. The mechanical and optical units are enclosed in a casing 6.

The mechanical unit 2 consists mainly of a cylinder-shaped film holder 7 having at one end a toothed wheel 8 which is rotatably threaded on a tubular shaft 9 that has threads along all of its length and has a toothed wheel 10 rigidly secured at one of its ends. The shaft 9 is in turn rotatably mounted on a tubular shaft 11 that is rigidly attached to one of two opposite sides of the casing 6. The length of the threaded shaft 9 is substantially half the length of the shaft 11. The toothed wheels 8 and 10 mesh with toothed wheels 12 and 13 respectively on a shaft 14 which is rotatably mounted in bearings on the opposite sides of the housing and the shaft 14 is operatively connected to an electrical motor 15 which is arranged to rotate the shaft 14 with a uniform velocity. When the shaft 14 is rotated, the shaft 9 as well as the film holder 7 are caused to rotate, both in the same direction. However, there are different ratios between the wheels 8, 12 and 10, 13, so that the film holder 7 and the threaded shaft 9 will rotate at different speeds. As a consequence of this the film holder 7, while rotating, is threadly advanced along the shaft 9 a certain distance for each revolution. The length of the distance depends on the pitch of the thread and the difference between the above mentioned gear ratios. A point fixed relative to the casing 6 will thus have relative motion along a spiral line on the cylinder film surface. This gives scanning lines parallel to each other in the film plane, and by choosing the pitch and gear ratio in a suitable way the lines can be positioned as close as required to obtain a desired accuracy of the scanning. By means of a pulse transducer 16 which is operatively connected to the movable shaft 14 through gearing and which is arranged to give pulses timed with the rotation of the film holder 7, an unambigous value of the movement of the film 4 is obtained. The pulse transducer 16 is connected to the electronic unit 3.

The optical unit comprises a light emitting diode 17 and two photocells 18, 19. The light from the light emitting diode strikes a tilted half transparent mirror 20 from which a portion of the light is reflected against the film 4. The film is struck at substantially right angles by the light, which gives rise to a spotlike light on the film. A portion of the light inciding the film 4 passes through it and is reflected against the photocell 18 by means of a reflecting prism 21, housed inside the tubular shaft 11 along the center of the shaft. A portion of the light from the light emitting diode 17 passes through the mirror 20 and falls onto the photocell 19. The photocells 18, 19 are arranged to give electric signals which correspond to the intensity of the incident light, the output signal designated $S_T$ of the photocell 18 thus corresponding to the intensity of the light passing through the film 4 while the output signal, designed $S_o$, of the photocell 19 corresponds to the intensity of the light inciding the film 4. As previously mentioned, the ratio $S_T/S_o$ is a measure of the transmission of the film 4. As more fully shown in FIG. 2 the photocells 18, 19 as well as the light emitting diode 17 are connected to the electronic unit 3 which comprises circuits that are arranged in such a way that the measurement can be carried out by the method according to the invention.

Figure 2:
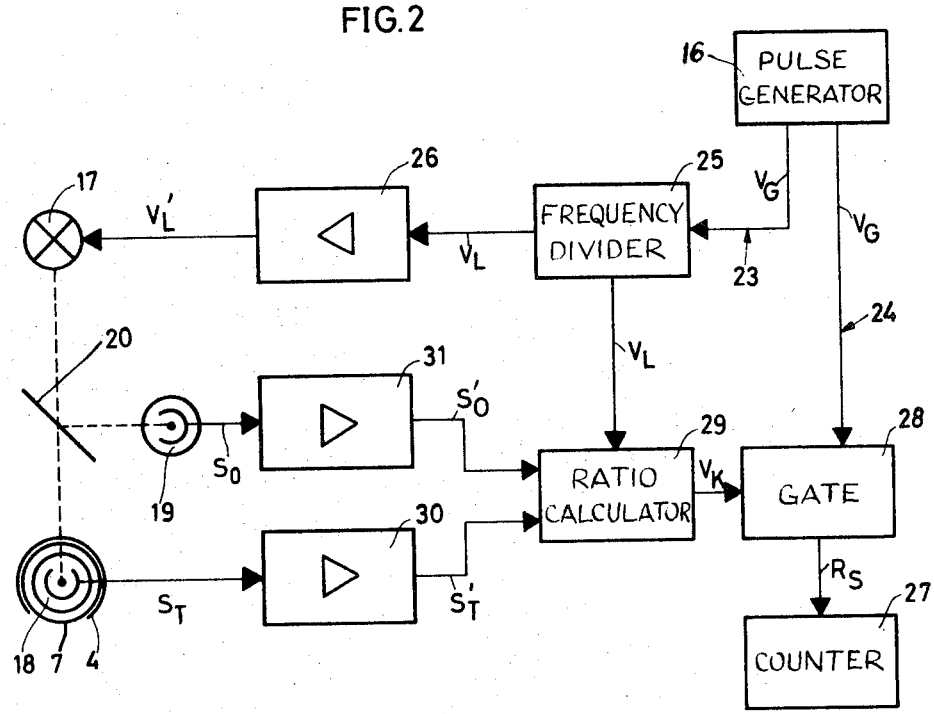
FIG. 2 is a block-diagram showing as an example the manner n which the measurement and the continued signal treatment occur in a film scanner operating according to the method of the invention.
Figure 4:
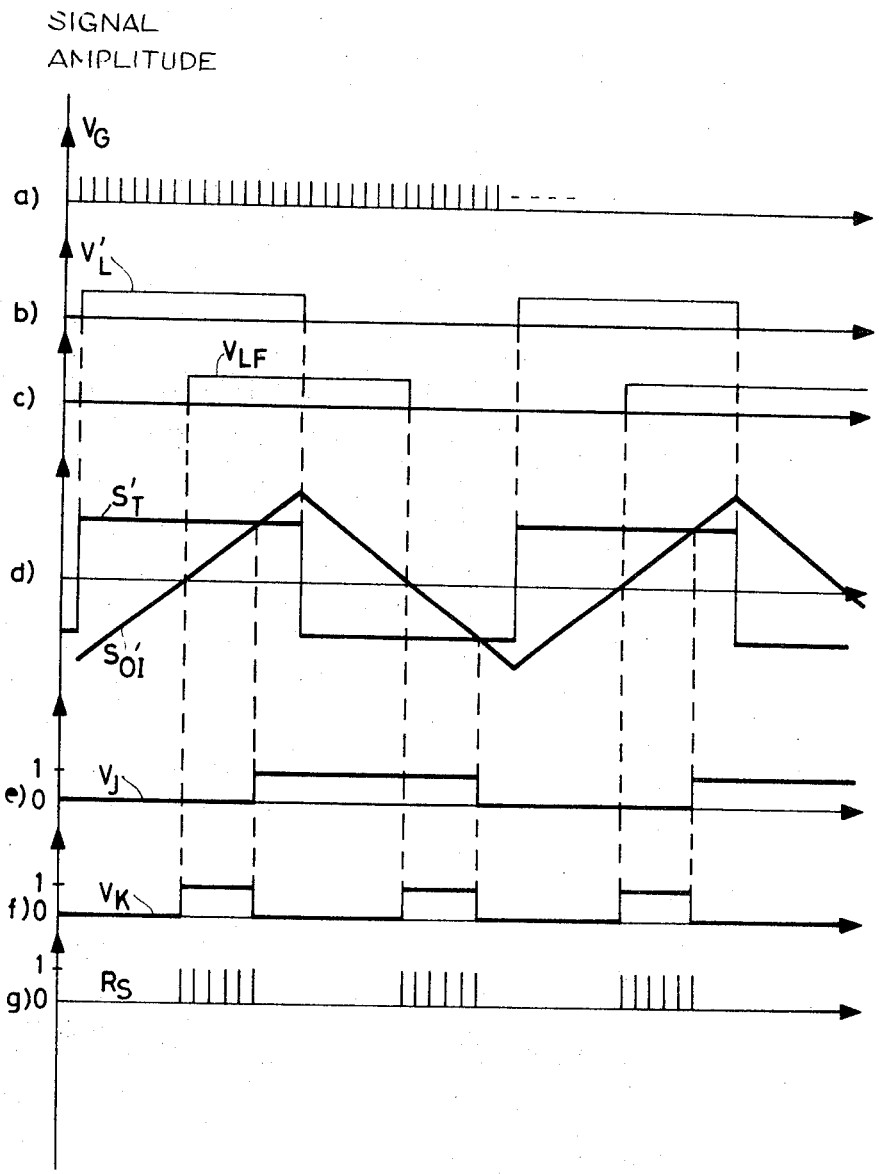
FIG. 4 is a diagram illustrating the time sequence of signals which appear at certain points in the block diagram of FIGS. 2 and 3.

In FIG. 2 the numeral 16 designated the pulse generator which is arranged to deliver a pulse signal $V_G$ whose lapse is shown in FIG. 4, diagram $a$. According to the invention the output of the pulse generator 16 is connected to two parallel channels 23, 24 the channel 23 of which comprises a frequency divider 25, an amplifier 26 and the light emitting diode connected in series. The mission of the frequency divider 25 is to form from the pulse signal $V_G$ a pulse train $V_L$ whose frequency is an integral fraction of the frequency of the signal $V_G$. From $V_L$ is received, after amplification in the amplifier 26, a pulse train $V_L'$ with the same frequency as $V_L$ and with sufficient amplitude to excite the light emitting diode 17 to produce a light whose intensity varies in pace with $V_L'$. How $V_L'$ varies as a function of time is shown in FIG. 4 diagram $b$.

The channel 24 comprises a counter 27 which is connected to the pulse generator 16 through an electronic gate 28. The gate 28 is arranged to gate the signal $V_G$ to the counter 27 during time periods the duration of which is calculated by a ratio calculator 29 to correspond to the ratio between the incident and the transmitted light, i.e., to the light transmission of the film 4. The lapse of gated signal, called $R_S$, is shown in FIG. 4, diagram $g$. How the duration of the time periods can be adapted to correspond to the transmission of the film 4 will be described in connection with FIG. 3, which illustrates the ratio calculator in more detail.

The photocells 18, 19 whose output signals are designated by $S_T$ and $S_o$, respectively, are connected through two amplifiers 30, 31 to the inputs of the ratio calculator 29. After amplification the signals $S_T$ and $S_o$ are respectively designated $S_T'$ and $S_o'$. The signals $S_T$ and $S_o$ and of course also $S_T'$ and $S_o'$ are in phase with each other and with $V_L$. How $S_T'$ varies as a function of time is shown in FIG. 4, diagram $d$. The output signal of the ratio calculator 29 which depends on the ratio $S_T/S_o$ and which controls the gate 28, is called $V_K$ and varies with time as shown in FIG. 4, diagram $f$. As seen from the following the ratio calculator needs for its function a signal which is in phase with $V_L$. As mentioned both $S_o$ and $S_T$ are in phase with $V_L$ and thus they are usable, but for reasons of load capacity the ratio calculator, as seen from FIG. 2, is connected directly to the frequency divider 25.

The film scanner according to FIG. 2 operates in the following manner. The light emitting diode 17, which as abovementioned is caused to emit light whose intensity varies with a frequency that in an integral ratio to the frequency of the pulse signal $V_G$, illuminates the film 4 via the semi-transparent mirror 20. The photocell 18 produces the signal $S_T$ which electrically reproduces the intensity of the light that is transmitted through the film and which varies with the blackening of the film. By means of the mirror 20 and the photocell 19 the signal $S_o$ representing the intensity of the light ahead of the film is produced, which signal is to be regarded as a reference signal. After amplification, the two signals are fed to the radio calculator 29, which is arranged to produce the signal $V_K$ which contains control pulses whose duration depends on the ratio $S_T/S_o$. The control pulses open the gate 29 so that the counter 27 will be fed with the pulses in the pulse signal to a number that corresponds to $S_T/S_o$, i.e., to the transmission of the film.

Figure 3:
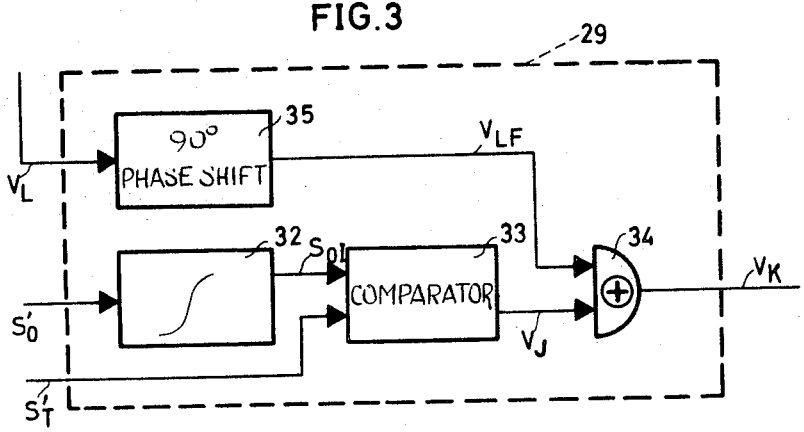
FIG. 3 is another block-diagram showing as an example how the ratio forming means according to FIG. 2 can be built up.

The ratio calculator 29 in FIG. 3 comprises an integrator 32 the input of which is connected to the output of the amplifier 31 and the output of which is connected to one of the inputs of a comparator 33 having two inputs. The second input of the comparator 33 is connected to the amplifier 30. The output of the comparator is connected to one of the inputs of a so called EXCLUSIVE OR-gate 34 having two inputs, the other of which is connected to a phase shift circuit 35 having 90° phase shift and being fed by the signal $V_L$ from the frequency divider 25.

The output signal of the integrator 32 called $S_{ol}$ is shown in FIG. 4, diagram $d$. Since the input signal $S_o'$ to the integrator is a square wave signal $S_{ol}$ will be a triangular signal. The comparator 34 is arranged to compare the signals $S_T'$ and $S_{ol}$ with each other and to give a binary output signal $V_J$ which is logical zero when $S_T'$ is greater than $S_{ol}$ and which is logical one when $S_T'$ is less than $S_{ol}$. The signal $V_J$ is thereby given the same frequency as $S_o$ or $S_T$, i.e., the same frequency as the light pulses. It can also be shown that the signal $V_J$, by the abovementioned disparity conditions, obtains a phase shift that, in relation to a signal which has a phase shift of 90° in relation to $V_L$, is proportional to $S_T/S_o$. Such a signal having a phase shift of 90° relative to $V_L$ is attained by the phase shift circuit 35 whose output signal can be regarded as a binary signal called $V_{LF}$ and is shown in FIG. 4, diagram c.

The gate 34 is arranged to compare the signals $V_{Lf}$ and $V_j$ and to give a binary output signal which is logical zero when the input signals are equal, i.e., when both of them are logical zero or both of them are logical one, and which is logical one when the signals are unequal. The output signal of the gate 34, which is the earlier mentioned signal $V_K$, becomes by this a pulse signal with a pulse duration that depends on the ratio $S_T/S_o$, i.e., the transmission of the film.

By letting the signal $V_K$ control the gate 28, the counter 27 holds, after one light pulse, a number that is proportional to the transmission of the film in the point that is just being scanned. By letting the counter receive counting pulses during a variable number of consecutive light pulses, the contents of the counter will still correspond to the transmission of the film, but since the measurement is carried out during a plurality of light pulses the contents are to be regarded as a low-pass filtered value of the transmission. More specifically, the counter 27 can be one that is adapted to count counting pulses $V_G$ during a selected number of consecutive light energizing pulses $V_L$, and to divide the number of counted pulses by the number of light energizing pulses to provide an average value of the relative transparency of the film.

What is claimed as my invention is:

1. A method of obtaining a digitized measurement of the relative opacity and transparency of different parts of a substance as the same is being scanned with a beam of light, which method is characterized by:
   A. producing clock pulses at a frequency which is synchronized to the rate at which the substance is being scanned;
   B. producing a train of successive energizing pulses that are synchronized to the clock pulses, every energizing pulse having a duration equal to the time required for producing a predetermined integral number of clock pulses and the pauses between successive energizing pulses likewise having uniform durations in terms of an integral number of clock pulses;
   C. in unison with production of the energizing pulses, energizing a light source used for scanning;
   D. producing a pulsing data signal, the pulses of which have a magnitude that corresponds to the intensity of light from said source that has passed through the substance being scanned;
   E. during the duration of each energizing pulse producing a reference magnitude signal having a magnitude that changes linearly at a predetermined rate;
   F. comparing the magnitude of each pulse of the data signal with its coexisting reference magnitude signal, and producing a difference signal whenever the difference between the compared magnitudes is of a predetermined sign; and
   G. during a predetermined portion of each energizing pulse, which portion is the same for every energizing pulse, counting clock pulses for as long as the difference signal coexists with said portion of the energizing pulse.

2. A method of measuring the relative opacity and transparency of different parts of a substance as the same is being scanned with a beam of light, which method is characterized by:
   A. producing clock pulses at a frequency which is synchronized to the rate at which the substance is being scanned;
   B. producing a train of successive energizing pulses that are synchronized to the clock pulses, every energizing pulse having a duration equal to the time required for producing a predetermined integral number of clock pulses and the pauses between successive energizing pulses likewise having uniform durations in terms of an integral number of clock pulses;
   C. in unison with production of the energizing pulses, energizing a light source used for scanning;
   D. producing a pair of simultaneously pulsing signals,
      1. one of which has a pulse magnitude that corresponds to the intensity of light from said source that has passed through the substance being scanned, and
      2. the other of which has a pulse magnitude that corresponds to the intensity of light at said light source;
   E. integrating said other pulsing signal to produce a comparison signal of constantly varying magnitude;
   F. continuously comparing the pulse magnitude of each pulse of said one pulsing signal with the then prevailing magnitude of said comparison signal, and producing a difference signal whenever the difference between the compared magnitudes is of a predetermined sign; and
   G. during a predetermined portion of each energizing pulse, which portion is the same for every energizing pulse, counting clock pulses for as long as the difference signal persists, to thus obtain a digitized measure of the relative opacity and transparency of the portion of the substance then being scanned.

3. The method of claim 2, further characterized by:
   H. defining the portion of each energizing pulse during which clock pulses are to be counted by producing a train of phase-shifted pulse signals, each of which is in a predetermined phase relation to an energizing pulse; and
   I. counting clock pulses during each energizing pulse only while a phase-shifted pulse signal and a difference signal simultaneously coexist.

* * * * *